Aug. 26, 1969          J. C. TURRO          3,463,520
COMBINATION COLLAR-CLAMP AND SHAFT COUPLING
Original Filed Jan. 7, 1965
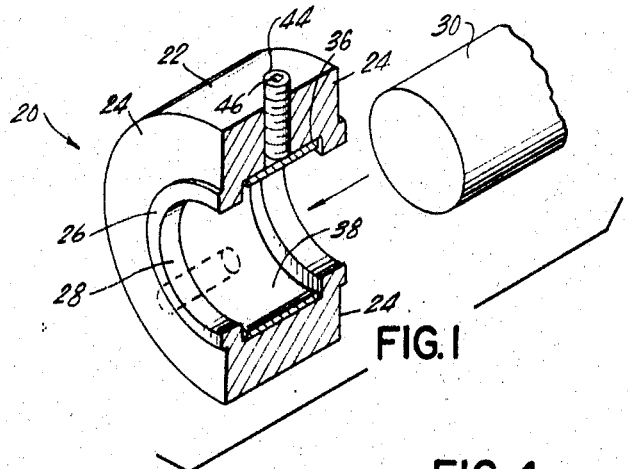
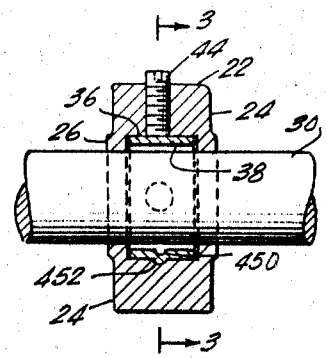
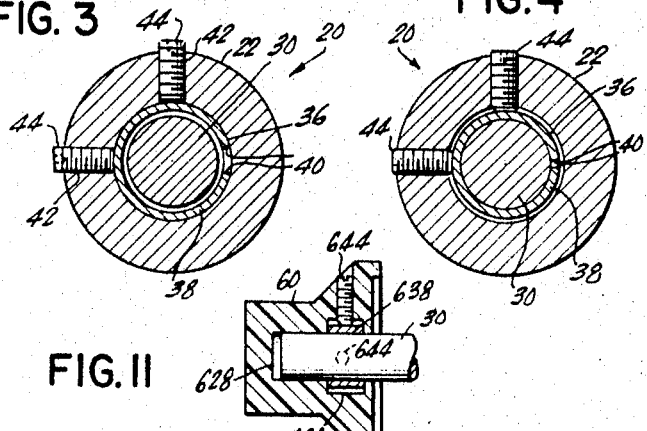
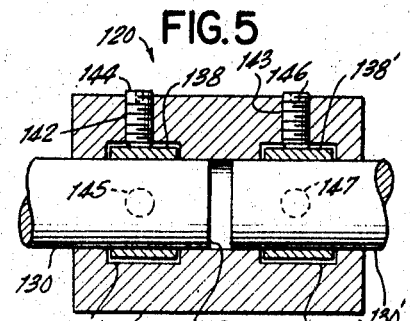
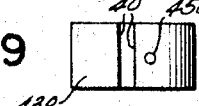
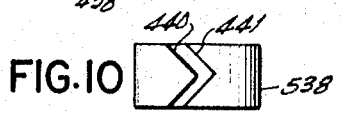
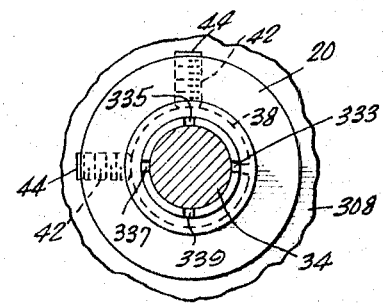
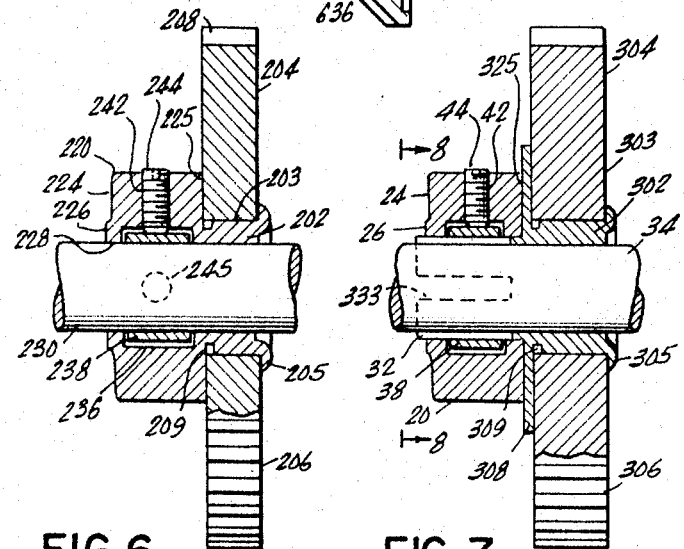
INVENTOR.
JEROME C. TURRO
BY
Briskin & Goldfarb
ATTORNEYS

United States Patent Office 3,463,520
Patented Aug. 26, 1969

3,463,520
COMBINATION COLLAR-CLAMP AND SHAFT COUPLING
Jerome C. Turro, 245 Rumsey Road, Yonkers, N.Y. 10701
Continuation of application Ser. No. 424,002, Jan. 7, 1965. This application Mar. 6, 1968, Ser. No. 711,134
Int. Cl. F16d 1/06
U.S. Cl. 287—52.08                                         5 Claims

ABSTRACT OF THE DISCLOSURE

A shaft ring device as constructed which clamps around a shaft without creating a burr or disfigurement on the shaft itself by providing a split clamping ring held captive in a recess in the shaft ring and actuated by a radial screw element.

---

The present invention relates generally to a combination collar-clamp and shaft coupling, and more particularly to a shaft ring which may be employed as a shaft set-collar, as a gear clamp or as a shaft coupling, and which is particularly suited and adapted for use in precision instruments and devices.

This application is a continuation of application Ser. No. 424,002, filed Jan. 7, 1965, and now abandoned.

In precision instruments, whenever it becomes necessary to make an adjustment so as to change the rotational angle of a gear on a shaft, for example to calibrate the instrument or to fix zero settings, rapid release of the gear hub from the shaft is required, and this is provided by a split hub on the gear, which hub projects axially and is tightened around the shaft. This arrangement is referred to as a "floating" gear and is easier to adjust than if the gear is pinned or keyed to the shaft. In such assemblies, the gear having a split hub affixed thereto is slipped over the shaft and a C-like clamp is fitted over the split gear hub, after which a set screw in the C-clamp is tightened to as to press and lock the gear hub against the shaft.

The heretofore known shaft clamps for holding such gears with projecting split hubs onto shafts had generally been formed in a C-like configuration, with a set screw extending across the open portion of the "C" of the clamp, the set screw serving to tighten or to press the clamp onto the shaft. In order to increase the flexing or bending of the clamp, a notch is usually formed in the C-clamp opposite the open end of the "C" to allow the clamp to be tightened or compressed about the shaft. However, in actual use and practical application, the tightening of the set screw and the concurrent compression of such clamps places a severe and continuous concentration of stresses upon the clamp structure adjacent to the notch, and this frequently results in metal fatigue failure during use, often even causing breakage of the clamp.

In order to strengthen the walls of such prior art C-clamps and overcome fatigue failures, attempts have been made to make the clamp of thicker material, but with the attendant result of enlargement in the outer diameter and overall size of the clamp to accommodate the set screw.

Furthermore, the tightening of the set screw causes a pre-stress on the screw and on the threads of the clamp which the set screw engages. In guided missile installations and in other precision instrumentation where such C-like clamps have been employed, fatigue failures have often occurred due to such pre-stress condition of the set screws. Although such clamps have been fabricated from stainless steel or alloy steel in order to provide greater strength and resistance to fatigue, such clamps have still been found unsatisfactory due to the fact that the threads engaged by the screws have a tendency to become stripped when the necessary force is applied to tighten the set screw. With the threads stripped, the clamp thereby becomes inoperative, often even while in service.

In the prior art type C-clamps, it has been found that if the set screw loosens as little as one degree, or sometimes even as little as one minute of a degree, the clamp or collar could become loosened on the shaft. Since the tightness of clamping in precision instruments varies with variations in temperature even caused by the machining operation, it is very essential that the set screw be sufficiently tight to secure clamping of the collar or clamp onto the shaft, but still not so tight as to injure the set screw threads. In an attempt to assure tightness of the set screw, it has even been attempted to place a longitudinal cross screw in addition to the main set screw in order to hold the latter in place. However, this additionally increases the size of the clamp and does not assure the secure clamping in position.

Furthermore, the configuration of the C-like clamp of the prior art limits the applications to which it can be used. Because it is expensive to fabricate and because it provides insufficient axial thrust retention, it is not feasible to use such C-clamps as a thrust or set collar. Therefore, the utility of such C-like clamp of the prior art has been limited to clamping assemblies of gears or wheels having split hubs onto shafts.

A further disadvantage of the prior art collars provided with set screws or taper pins for engaging or passing into the shafts is that if the collar is set-screwed or fastened by a taper pin to the shaft, in either case a burr is left on the shaft, and the collar as well as the gear, to be removed, have to be forced off of the shaft over such a burr. In precision instruments, the tolerances are so close that the hairy burr so caused creates a serious problem, often damaging the shaft to the extent that the precision assembly cannot be taken apart without being damaged. It requires a great deal of skill in order to remove the gear without damage to expensive parts. Usually, at least the damaged shaft must be replaced, and often even the entire assembly must be rejected. This, in any event, prolongs the time of assembly of the parts and requires the time and attention of a highly skilled workman.

It is therefore an object of the present invention to provide a shaft collar which functions to clamp around a shaft in a peripheral frictional manner without creating a burr on the shaft.

It is another object of the invention to provide a peripheral clamp to hold the split hub of a gear or wheel in place on a shaft, which clamp is of a smaller diameter than heretofore possible, without any attendant loss of structural strength, which is inexpensive to manufacture, which is simple in construction, and which will enable gears or the like to be frictionally secured and removed on the shaft of a precision assembly without any damage to the shaft, to the gears, or to the assembly.

Another object of the invention is to provide a shaft and gear clamp for precision instruments which will completely and peripherally encircle the shaft or gear hub without having points of stress concentration and thus avoid metal fatigue of the clamp.

Another object of the invention resides in the provision of a shaft or gear clamp which may also be conveniently and economically used as a shaft set collar and which thus eliminates loss of time in assembling and disassembling precision instruments.

In precision instruments where frequent assembly and disassembly is necessary, it has been the practice to sometimes machine a flattened rest seat on the shaft to provide a recessed location for the set screw to come to rest, and thus prevent a burr from forming or protruding beyond the shaft diameter. It has also been the practice to provide a cylindrical undercut for axial thrust purposes. Such flattened rest seats or cylindrical undercuts are expensive to machine.

It is therefore a further object of the invention to provide a collar-clamp which will frictionally engage the shaft in a peripheral manner without requiring expensive machining of the last mentioned type.

Frequently collars of the prior art have been pinned to the shaft with a taper pin. The drilling and reaming operation for such taper pinning is expensive as to tools, labor and time required.

It is a further object of the invention to provide a clamping collar which peripherally clamps a shaft frictionally and which avoids the need for expensive tools and time-consuming machining operations.

It is another object of the invention to provide a combination collar-clamp and shaft coupling which can be formed integrally as one piece with the hub of a gear, of a cam or of a flywheel assembly.

Another object of the invention is to provide a shaft coupling which can be readily attached to two aligned shafts so that the shafts may be readily assembled into mutual alignment for transmission of torque, without damage to the shafts and without leaving a hairy burr on the shafts.

A further object of the invention is to provide a shaft ring which is inexpensive to produce and which peripherally clamps a shaft or other object inserted into its bore with sufficient friction to provide end-thrust retention.

Still another object of the invention is to provide a shaft ring in which clamping portions are provided in tandem to engage aligned shafts so as to couple the shafts together, which shaft ring will not be subject to fatigue failure, and which will provide a positive shaft coupling to transmit torque.

Still another object of the invention is to provide a collar-clamp or shaft coupling which will be dynamically balanced so as not to cause vibration of the shaft while rotating at high speeds.

Still another object of the invention is to provide a precision type combination collar-clamp and shaft coupling device which will be inexpensive to produce and assemble.

Still another object of the invention is to provide a combination collar-clamp and shaft coupling device which will not demage the shaft upon which it is affixed.

To these ends, and in accordance with one feature of the invention, I provide a shaft ring, of generally cylindrical configuration, with an internal cylindrical undercut or recess which is larger in diameter than the shaft-receiving bore of the ring. A flat leaf spring having a C-shaped configuration is fitted into the cylindrical recess, and since its spring force tends to urge the open ends of the "C" away from each other, the spring automatically is retained within the recess. One or more set screws radially positioned in the shell of the ring tend to close the spring peripherally around a shaft inserted into the bore so as to uniformy frictionally engage the shaft.

According to another feature of the invention, the ring is formed integrally with the hub of a gear which is swaged or rolled onto the gear to form one piece therewith.

According to a modification of the device, the novel cylindrical ring is made long enough axially to incorporate two coaxial recesses, each recess being provided with a C-spring for engaging a separate one of a pair of aligned shafts, and with set screws for clamping the C-springs around the respective shafts, thus forming a friction couping for the pair of shafts.

According to a modification of the C-spring, a raised dimple may be punched into the spring to fit into a corresopnding recessed dimple machined into the undercut recess. These cooperating raised and recessed dimples help prevent peripheral rotation of the spring within the recess.

According to a further modification of the C-spring, instead of having parallel flat opposed ends of the open portion of the C-spring, the ends are formed as a herringbone-shaped point and "V," in order to minimize the peripheral location within the inner peripheral recess where a set screw might possibly engage the opening between the spring ends without pressing against the spring itself.

These, together with various ancillary objects, features and attendant advantages of the invention, will become more apparent as the following description proceeds, and are attained by the collar-clamp and shaft coupling of the invention, preferred embodiments of which are illustrated in the accompanying drawings by way of example, only, wherein:

FIG. 1 is a perspective view showing in half-section the construction of the combintion collar-clamp and illustrating a shaft to which the device can be affixed;

FIG. 2 is a longitudinal sectional view of the collar-clamp according to the invention, shown located about a shaft with the clamp device open;

FIG. 3 is a transverse sectional detail view illustrating the collar-clamp of the invention in an open position about a shaft, as taken along the plane of line 3—3 of FIG. 2;

FIG. 4 is a transverse sectional detail view illustrating the collar-clamp of FIGS. 1–3 in closed condition and clamped about a shaft;

FIG. 5 is a longitudinal sectional detail view of another embodiment of the invention, comprising a shaft coupling with two collar-clamps similar to that of FIGS. 1–4 but integrally arranged axially in tendem;

FIG. 6 is a modification of the device of FIGS. 1–4 shown in longitudinal cross-section and illustrating a collar-clamp integrally formed as the hub affixed to a gear and forming a unitary gear and shaft clamp assembly, with the clamp being illustrated in closed position about the gear shaft;

FIG. 7 is a longitudinal view of the device of FIGS. 1–4 in a position as applied around a split hub of a gear to secure the gear to a shaft;

FIG. 8 is a transverse sectional detail view of the device of FIG. 7 taken along the plane of line 8—8 of FIG. 7;

FIG. 9 is a plan view of one form of the internal spring utilized in the collar-clamp and coupling of the present invention;

FIG. 10 is a plan view of a modification of the internal spring of FIG. 9; and

FIG. 11 is a longitudinal cross-sectional view of the collar-clamp of the present invention as formed as an integral part of a radio knob or the like.

In the accompanying drawings, like reference numerals designate similar parts throughout the various views. In the drawings, reference numeral 20 issued to generally designate the collar-clamp.

The collar clamp 20 is formed in a generally cylindrical configuration and has a smooth outer peripheral surface 22 and parallel side walls 24, 24. A central bore 28 extends axially through the collar clamp 20, and a shoulder 26 is provided around the bore at the innermost portion of at least one of the side walls 24. The shoulder 26 serves as an axial spacer and bearing surface where necessary, as will be further described below in relation to FIGS. 6 and 7. A main bore 28 is adapted to receive a shaft 30 or the split hub 32 (FIGS. 7, 8) to be mounted on a shaft 34. A cylindrical undercut or recess 36 having a diameter larger than that of the main bore 28 is formed coaxially with the bore 28 and is adapted to receive a split cylindrical spring 38 having a C-shaped cross section. The C-spring 38 is biased in such a manner that when it is inserted into the recess 36, the ends 40 of the open C portion of the spring 38 are urged apart so that the spring 38 is pressed against the surface of the recess 36 and thus tends to maintain itself in axially captive position. The thickness of the spring 38 is so selected in relation to the diameter of the recess 36 and the diameter of the bore 28 so that the inner diameter of the spring 38 in open position, i.e. with the set screw withdrawn, is of a larger dimension than the bore 28 or larger than the outer diameter of the shaft 30 or of the hub 32. In clamped position, of course, the inner diameter of the spring 38 is approximately the same as the outer diameter of the shaft 30.

At least one radial bore 42, 42 is provided and threaded to receive a set screw 44. The set screw is provided preferably with a recessed kerf, or a square or hexagonal socket 46. Although one set screw 44 would normally be sufficient for operation of the device, an extra set screw 44 may optionally be provided.

Operation of the device of FIGS. 1–4 is as follows. The device 20 is slipped over the shaft 30 (or over a split hub 32) and one or both of the set screws 44 are tightened radially inwardly. As best shown in FIGS. 3 and 4, the tightening of the set screw 44 presses the edges 40 of the C-spring 38 together until the C-spring 38 frictionally engages the outer surface of the shaft 30 (or hub 32). Since the inner end of the screw 44 never touches the shaft 30, it cannot possibly mar or injure the outer peripheral surface of the shaft.

In the modification of FIG. 5, a coupling device, indicated generally by the numeral 120, comprises a pair of rings similar to that of FIGS. 1–4 integrally arranged in tandem in an axial manner. A cylindrical body 122 is provided with a main bore 128 adapted to receive two aligned shafts 130, 130'. Two aligned coaxial recesses 136, 136' are machined in the body 122 around the main bore 128, and each recess 136, 136' is adapted to receive a respective C-spring 138, 138' similar to the spring 38 above described relative to FIGS. 1–4. Each recess 136, 136' is provided with at least one radial set screw. In FIG. 5 two set screws are illustrated for each recess, the recess 136 being provided with two threaded holes 142, 145 at right angles to each other, each adapted to receive a respective set screw 144. Similarly, the recess 136' is provided with two threaded holes 143, 147, each provided with a respective set screw 146.

Operation of the coupling of FIG. 5 is as follows. The shafts 130, 130' are aligned and each inserted into one of the opposed ends of the main bore 128 in the body 120. When the shafts are aligned and brought together the desired distance, the set screws 144 and 146 are tightened. When second set screws are employed, such as in the holes 145, 147, these are also tightened. The C-springs 138, 138' are thus peripherally frictionally tightened around their respective shafts 130, 130'. The body 122 thus rotates together with the shaft 130, 130' and transmits torque from the driving shaft to the driven shaft.

In the embodiment of FIG. 6, collar-clamp according to the invention, generally designated by the numeral 220, forms part of a gear hub 202 which is press-fitted into the bore 203 of a gear wheel 204 and rolled over or swaged at 205 onto the opposed face 206 of the gear wheel. The gear is provided with teeth 208 on its outer periphery, and the hub 220, 202 is provided with a main bore 228 adapted to receive a shaft 230 on which the gear togehther with its hub 202, 220 is mounted. The gear, hub and clamp rotate together with the shaft 230. The clamp portion 220 of the hub has an outer side 224 and an inner side 225, the latter side resting flush against one lateral face of the gear 204. The innermost portion of the face 224 is provided with a shoulder 226 which acts as a spacer or thrust washer between the surface 224 and any journal bearing or other member (not shown) which may be mounted on the shaft 230 to the left of the device 220. As in the other embodiments, a cylindrical recess 236 is provided into which a C-spring 238 is fitted in a manner similar to that above described with respect to the spring 38 of FIGS. 1–4. A set screw 244 operating radially in a threaded hole 242, and if desired, a second set screw 245, operate to peripherally frictionally tighten the spring 238 about the shaft 230, thus fixing the integral hub 202, 220 and the gear 204 onto the shaft 230. The integral hub and clamp 202, 220, is preferably provided with an annular undercut 209 so that when the hub 202 is press-fitted into the bore 203 of the gear, any burr which forms will be retained within the undercut 209 and will not prevent the surfaces at the interface 225 from lying flush against each other. Of course, it is understood that instead of a gear 204, other wheel means such as a cam disc or flywheel may be similarly provided with an integral hub and shaft clamp 202, 220 in the same manner as shown for the gear 204 in FIG. 6.

In the illustration of FIGS. 7 and 8, a gear disc 304 having a split hub portion 302 is shown mounted on a shaft 34 and clamped thereon by a clamp 20 of the type illustrated in the FIGS. 1–4. The hub 302 is press-fitted into the bore 303 of the gear disc 304 and is swaged or rolled over the lateral face 306 of the gear disc at 305. Instead of being integrally formed with the clamping member 20 however, as in the embodiment of FIG. 6, the hub 302 is separate from the clamp, and is provided with a lateral thrust member 308 which abuts one of the lateral faces 325 of the collar-clamp 20. An annular recess 309 is provided which serves the same purpose as the annular recess 209 above discussed relative to the embodiment of FIG. 6. The hub 302 has a split laterally extending portion with prongs 32 defining interspaces 333, 335, 337, 339 between them. In the embodiment of FIGS. 7 and 8 no shoulder 26 is provided on the face 325 which abuts against the surface of thrust member 308 of the hub 302, although a shoulder 26 is provided on the opposite face 24.

The device of FIGS. 7 and 8 operates as follows. When one or more of the set screws 44 is tightened inwardly in its corresponding threaded hole 42, it peripherally tightens the spring 38 around the prongs 32 of the hub 302 and presses them frictionally against the shaft 34, thus tightly fixing the hub 302 and its gear disc 304 onto the staft 34.

FIG. 9 illustrates a modification of the spring 38, 138, and is generally designated by the numeral 438. A raised bump or pimple 450 is stamped into the spring to protrude outwardly, and a similar but mating dimple 452 (FIG. 2) is formed or machined into the body 22, and extending radially outwardly from the cylindrical surface of recess 36, so that when the spring 438 is placed into position the pimple or bump 450 mates with the dimple 452 and prevents peripheral rotation of the C-spring 438.

In the embodiment of FIG. 10, the C-shpring designated generally as 538 may be used instead of any of the springs 38, 138, 138', 238 in any of the above described embodiments. However, instead of the flat edges 40 (FIG. 9) of the open portion of the "C," the edges 440, 441 of the spring 538 mate in a herringbone manner, the edge 440 being formed as a point which extends within and between the V-shaped edge 441. When the spring 538 is placed into a corresponding recess 36, and if it should happen to turn peripherally within the recess so that the gap between the edges 440 and 441 is located directly opposite a single provided set screw 44, there would always be a point on the spring 538 which the set screw 44 would be able to engage, and a minimum opportunity for the set screw to coincide only or completely with an interspace between the spring ends.

In the embodiment of FIG. 11, the invention is shown incorporated into a radio knob or other instrument knob mounted on a spindle or shaft 30. The knob 60, of plastic or other material, has a recess 636 formed therein adapted to receive a C-spring 638, similar to the spring 38 of FIGS. 1–4 and frictionally clamped peripherally by one or more set screws 644. The main bore 628 is blind-ended and the bore 628 as well as the recess 636 around the bore may be formed by molding directly into the body 60.

It will be obvious to those skilled in the art, upon the study of this disclosure, that this invention permits of various modifications and alterations with respect to the individual components and arrangements disclosed, and hence can be embodied in apparatus other than as particularly illustrated and described herein, without departing from the essential feature of the invention.

I claim:

1. A shaft ring device comprising a generally cylindrical body having a shaft-receiving bore, means forming at least one cylindrical recess around said bore, longitudinally split generally cylindrical spring means having a C-shaped transverse section disposed axially captive in said recess around said bore and having a raised pimple formed in the outer surface thereof, said recess defining a depressed dimple therein mating with said pimple to prevent peripheral motion of said spring means within said recess and means in said body for compressing said spring means radially inwardly so that said spring means is peripherally tightened.

2. A shaft ring device comprising a generally cylindrical body having a shaft-receiving bore, means forming at least one cylindrical recess around said bore, longitudinally split generally cylindrical spring means having a C-shaped transverse section disposed axially captive in said recess around said bore, said spring means defining opposed edges along the split portion thereof, said edges comprising a mating pointed end and a V-shaped end, means in said body for compressing said spring means radially inwardly so that said spring means is peripherally tightened, and cooperating mating means on said spring means and on the inner surface of said bore for preventing perpiheral movemet of said spring means within said recess.

3. A clamp device for clamping wheel means onto shafts, comprising, in combintion, wheel means defining a hub-receiving bore, a collar clamp for said wheel means and a hub means forming a hub therefor and located within said hub receiving bore, a first portion of said hub defining a main shaft-receiving bore, said hub means being a split hub having peripherally spaced prongs around said shaft, a portion of said collar clamp having a central shaft-receiving bore and located about said prongs, said wheel means having at least one planar axially transverse face, said collar clamp including means for clamping said wheel means and said hub to the shaft for rotation together therewith which comprises means within said collar clamp forming an annular cylindrical recess within the confines of said main bore, a longitudinally split generally cylindrical spring member having a C-shaped transverse section disposed axially captive in said annular cylindrical recess and surrounding said spaced prongs, means in said collar clamp for peripherally tightening said spring member around said prongs, said collar clamp having an outer axial side and an inner axial side, said inner side being arranged to normally rest adjacent said one planar face of said wheel means, and means forming an annular recess within the outer periphery of said hub contiguous with one end of said hub receiving bore to catch and retain burrs formed during assembly of said wheel means onto said hub means.

4. A device according to claim 3, said outer axial side having a protruding integral shoulder forming a flat outer face adapted to serve as a precision thrust bearing surface, said inner side being disposed adjacent said planar surface, and means axially located at the terminal end of said hub means fixing the latter to said wheel means.

5. A device according to claim 3, wherein said means for peripherally tightening said spring member comprises at least one set screw radially positionable into a spring compressing condition and a withdrawn condition, said spring member being normally biased so as to have an outside diameter in non-compressed condition larger than the diameter of said annular cylindrical recess, so that said spring is normally pressed against the outer periphery of said annular cylindrical recess when said set screw is in said withdrawn condition.

References Cited

UNITED STATES PATENTS

| | | | |
|---|---|---|---|
| 713,227 | 11/1902 | Levalley | 287—52.03 |
| 1,220,185 | 3/1917 | Cathcart | 287—52.09 |
| 2,222,334 | 11/1940 | Brouwer | 287—52.09 |
| 2,334,320 | 11/1943 | Evans | 287—535 |
| 2,401,351 | 6/1946 | Herbst et al. | 287—534 |
| 2,421,254 | 5/1947 | Froelich | 287—53 |
| 2,544,304 | 3/1951 | Eckenbeck et al. | 29—525 |
| 2,620,675 | 12/1952 | Meadows et al. | 287—52.08 XR |
| 2,855,666 | 10/1958 | Gleitz | 29—525 |
| 3,127,784 | 4/1964 | O'Neill | 287—52 XR |
| 3,174,212 | 3/1965 | Seltsam | 29—525 XR |

FOREIGN PATENTS 173,416   1/1922   Great Britain.

CARL W. TOMLIN, Primary Examiner

ANDREW V. KUNDRAT, Assistant Examiner

U.S. Cl. X.R.

287—52.09